(12) United States Patent
Childers et al.

(10) Patent No.: US 7,458,690 B2
(45) Date of Patent: Dec. 2, 2008

(54) LIGHT SOURCE MODULE

(75) Inventors: Winthrop D. Childers, San Diego, CA (US); William R. Wagner, Escondido, CA (US); John M. Koegler, Corvallis, OR (US); P. Guy Howard, Junction, OR (US); Timothy F. Myers, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 378 days.

(21) Appl. No.: 11/093,431

(22) Filed: Mar. 29, 2005

(65) Prior Publication Data

US 2006/0227561 A1    Oct. 12, 2006

(51) Int. Cl.
G03B 21/00    (2006.01)
G03B 21/20    (2006.01)

(52) U.S. Cl. .......................................... 353/85; 353/121
(58) Field of Classification Search .................... 353/85, 353/52, 119, 121; 362/373, 276, 376, 381; 315/108

See application file for complete search history.

(56) References Cited

U.S. PATENT DOCUMENTS

| | | | |
|---|---|---|---|
| 3,621,330 A | 11/1971 | Miller | |
| 3,673,424 A | 6/1972 | Philieger, Jr. | |
| 4,053,759 A | 10/1977 | Wilkinson | |
| 4,672,271 A | 6/1987 | Gear et al. | |
| 4,702,716 A * | 10/1987 | Roberts | 445/26 |
| 5,879,159 A | 3/1999 | Cipolla et al. | |
| 5,961,203 A | 10/1999 | Schuda et al. | |
| 6,362,573 B1 | 3/2002 | Helbing et al. | |
| 6,376,992 B1 | 4/2002 | Petrick | |
| 6,561,675 B1 | 5/2003 | Kavanagh | |
| 6,621,239 B1 | 9/2003 | Belliveau | |
| 2002/0145875 A1 | 10/2002 | Roberts et al. | |
| 2006/0055897 A1* | 3/2006 | Lerner et al. | 353/99 |

FOREIGN PATENT DOCUMENTS

| | | |
|---|---|---|
| JP | 2004179352 | 6/2004 |
| WO | 2004/054328 | 6/2004 |

OTHER PUBLICATIONS

International Search Report for Application No. PCT/US2006/011259. Report issued Aug. 25, 2006.

* cited by examiner

Primary Examiner—Rodney E Fuller (57) ABSTRACT

A light source module includes a lamp assembly having an integrated reflector and heat sink, the lamp assembly having a pressurized gas contained therein, an anode sealingly coupled to the integrated reflector and heat sink, and a cathode sealingly coupled to the integrated reflector and heat sink; and a projector protection system including at least one first projection feature for suspending current flow from the cathode to the anode when at least one first threshold is exceeded and at least one second projector protection feature for stopping the current flow when at least one second threshold is exceeded.

29 Claims, 6 Drawing Sheets

LIGHT SOURCE MODULE

BACKGROUND

Digital projectors, such as digital mirror devices (DMD) and liquid crystal display (LCD) projectors, project high-quality images onto a viewing surface. Both DMD and LCD projectors utilize high-intensity lamps and reflectors to generate the light needed for projection. Light generated by the lamp is concentrated as a "fireball" that is located at a focal point of a reflector. Light produced by the fireball is directed into a projection assembly that produces images and utilizes the generated light to form the image. The image is then projected onto a viewing surface.

Efforts have been directed at making projectors more compact while making the image of higher and better quality. As a result, the lamps utilized have become more compact and of higher intensity. An example of one type of such lamp is a xenon lamp. Xenon lamps provide a relatively constant spectral output with significantly more output than other types of lamps without using substantial amounts of environmentally harmful materials, such as mercury. In addition, xenon lamps have the ability to hot strike and subsequently turn on at near full power.

Xenon lamps include an anode and a cathode. The anode and cathode are precisely positioned relatively to one another such that a gap is established between them. The application of a voltage to the anode causes the voltage to arc to the cathode in the presence of the pressurized xenon gas, thereby generating light. In addition to generating light, the xenon lamp also produces heat. As this heat raises the temperature of the xenon lamp, the pressure in the xenon lamp is also raised. The lamps can suddenly fail in the event that the pressure and/or temperature inside the gas envelopes exceed a certain threshold.

SUMMARY

A light source module includes a lamp assembly including a reflector having a pressurized gas contained therein, an anode coupled to the reflector, and a cathode coupled to the reflector, and a pressure relief system, including at least one first pressure projector protection feature for suspending current flow from the cathode to the anode when at least one first threshold is exceeded and at least one second pressure projector protection feature for stopping the current flow when at least one second threshold is exceeded, the second threshold being higher than the first threshold.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A light source module and lamp assembly for use in a display system is provided herein that includes a projector protection system. The projector protection system includes a multi-stage or redundant apparatuses for preventing a buildup of heat in the module. For example, according to several exemplary embodiments, the projector protection system includes first and second projector protection features. The first projector protection feature is invoked when any number of first thresholds are surpassed while the second projector protection feature is invoked at a second, higher threshold. In one embodiment first threshold is exceeded when a cooling system component failure is detected. In another embodiment the first and/or second threshold corresponds to a temperature threshold within the light source module.

The first projector protection feature may be a "soft" protection system that shuts off power to the electrode in the event that a first pressure threshold is reached. At that first threshold irreversible damage to the lamp does not occur. At a second temperature threshold, which is above the first threshold, a "hard" protection is activated in the second pressure projector protection feature. At this temperature level, the lamp may be permanently disabled. This level is reached if failure exists in the first protection system.

Accordingly, the light source modules and lamp assemblies provided herein include redundant projection projector protection features. An exemplary display system will first be discussed, followed by a discussion of an exemplary light source module and its manner of operation. Thereafter, several exemplary lamp assemblies will be discussed.

In the following description, for purposes of explanation, numerous specific details are set forth in order to provide a thorough understanding of the present method and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
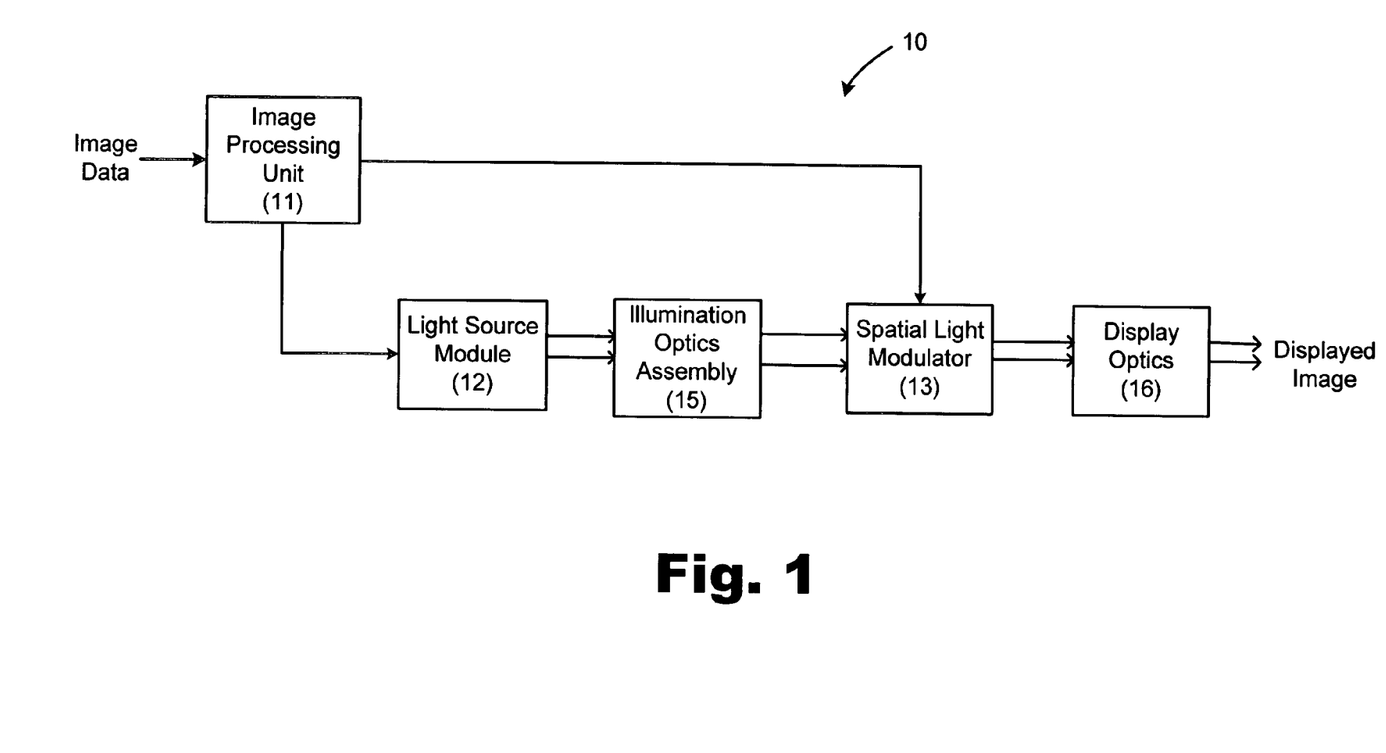
FIG. 1 illustrates a schematic view of a display system according to one exemplary embodiment.

FIG. 1 illustrates an exemplary display system (10). The components of FIG. 1 are exemplary only and may be modified or changed as best serves a particular application. As shown in FIG. 1, image data is input into an image processing unit (11). The image data defines an image that is to be displayed by the display system (10). While one image is illustrated and described as being processed by the image processing unit (11), it will be understood by one skilled in the art that a plurality or series of images may be processed by the image processing unit (11). The image processing unit (11) performs various functions including controlling the illumination of a light source module (12) and controlling a spatial light modulator (SLM) (13).

Figure 2:
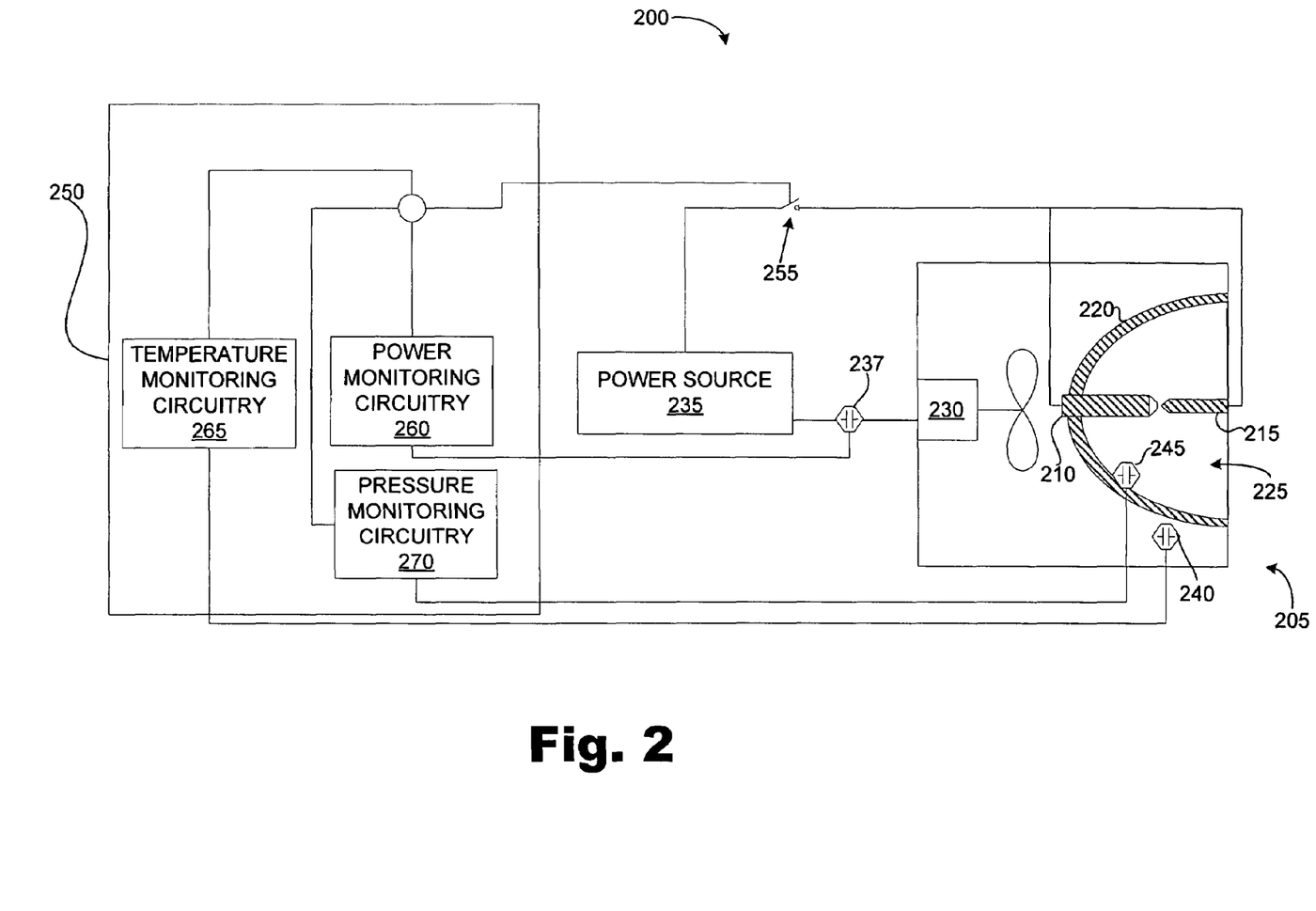
FIG. 2 illustrates a schematic view of a light source module according to one exemplary embodiment.

As will be discussed in more detail below, the light source module (12) includes a lamp assembly (205; FIG. 2), which includes an anode and a cathode coupled to a reflector, and a fan. The fan helps to maintain the lamp assembly at an acceptable operating temperature. The light source module also includes a multi-stage projector projection system. As-will be discussed in more detail below, the multi-stage projector protection system allows the lamp assembly to be deactivated when the lamp assembly reaches a first threshold.

In particular, the lamp assembly (205; FIG. 2) may be deactivated such that the lamp assembly may remain operational. The multi-stage pressure relief system allows the lamp assembly to be permanently deactivated if a second threshold is reached. According to several exemplary embodiments discussed below, the multi-stage projector protection system protects the projector when the second threshold is reached, while reducing the possibility that the lamp assembly will suddenly catastrophically fail.

The light source module (12) is positioned with respect to an illumination optics assembly (15)). The illumination optics assembly (15) directs light from the lamp assembly (12) to the SLM (13). The terms "SLM" and "modulator" will be used interchangeably herein to refer to a spatial light modulator. The incident light may be modulated in its frequency, color, phase, intensity, polarization, or direction by the modulator (13). Thus, the SLM (13) of FIG. 1 modulates the light based on input from the image processing unit (11) to form an image-bearing beam of light that is eventually displayed or cast by display optics (16) on a viewing surface (not shown).

The display optics (16) may include any device configured to display or project an image. For example, the display optics (16) may be, but are not limited to, a lens configured to project and focus an image onto a viewing surface.

Light Source Module

FIG. 2 illustrates a schematic view of a light source module (200) that includes a multi-stage projector protection system. The light source module (200) includes a lamp assembly (205) that includes an anode (210), a cathode (215), and a reflector (220). A cavity (225) is defined within the reflector (220). The anode (210) and cathode (215) are each coupled to the reflector (220) and are precisely positioned relative to each other within the cavity (225). The reflector (220) may be made of a metallic material, such that the reflector (220) acts as both a reflector and an integrated heat sink.

In the exemplary embodiment shown in FIG. 2, the anode (220) is coupled to the reflector (220) by placing the passing the anode (210) through a reflector opening. The distance by which the anode (210) and the cathode (215) are separated is referred to as the gap distance. By establishing the proper gap distance, light is generated when voltage is applied to the anode (210), while the cavity (225) is filled with a pressurized gas, such as Xenon. As the lamp assembly (205) operates, it generates heat. Frequently, as the temperature of the lamp assembly (205) rises, the pressure within the lamp assembly (205) also rises. A fan (230) is directed to the lamp assembly (205) to help cool the lamp assembly (210).

The fan (230) receives power from a power source (235). A current sensor (237) is located between the fan (230) and the power source (235). In addition, the light source module according to the present exemplary embodiment has a temperature sensor (240) located adjacent the reflector (220) and a pressure sensor (245) placed within the cavity (225). The temperature sensor (240) may also be placed directly within the cavity (225). The current sensor (235), the temperature sensor (240) and the pressure sensor (245) are each coupled to a first projector protection feature (250). The first projector protection feature (250) suspends operation of the lamp assembly when any number of first thresholds is surpassed. For ease of reference, a temperature threshold will be described herein. Those of skill in the art will appreciate that a pressure threshold with or in place of a temperature threshold.

Once any one of the first thresholds has been surpassed, the first projector protection feature (250) temporarily renders the lamp assembly (205) inoperable. In particular, the first projector protection feature (250) includes control circuitry that opens a switch (255) that decouples the power source (235) from the lamp assembly (205). The first projector protection feature (235) opens the switch (255) when any of the first thresholds is surpassed. For example, according to the present exemplary embodiment first thresholds include a first power threshold and a first temperature threshold. These associated thresholds will be discussed with reference to the first projector protection feature (250).

The first projector protection feature (250) includes power monitoring circuitry (260) to determine whether the fan (230) is drawing current (260). In particular, the power monitoring circuitry (260) is coupled to the current sensor (237) that is located between the power source (235) and the fan (230). When the fan (230) is operating and thus drawing current, the current sensor (237) sends a signal to the power monitoring circuitry that current is being drawn. The first power threshold relates to the operation of the lamp. Accordingly, when the power monitoring circuitry (260) determines that current is not being drawn or that insufficient current is being drawn for the fan to adequately cool the lamp assembly the power monitoring circuitry (260) determines the first power threshold has been surpassed. Once the first power threshold has been surpassed, the first projector protection feature (250) opens the switch (255). Accordingly, when the power monitoring circuitry (260) determines that the fan (230) is not drawing sufficient current, the first projector protection feature suspends operation of the lamp assembly (205).

In addition to power monitoring circuitry (260), the first projector protection feature (250) includes temperature monitoring circuitry (265). The temperature monitoring circuitry (265) is coupled to the temperature sensor (240) and monitors the temperature of the lamp assembly (205) adjacent the reflector (220). The temperature sensor (240) sends information indicating the temperature of the reflector (220). The temperature monitoring circuitry (265) then compares the temperature of the reflector to a first temperature threshold. If the temperature of the reflector is above the first temperature threshold, the first projector protection feature (250) opens the switch (255), thereby cutting power to the lamp assembly (205).

The first projector protection feature (250) according to the present exemplary embodiment also includes pressure monitoring circuitry (270). The pressure monitoring circuitry (270) is coupled to the pressure sensor (245). The pressure sensor (245) monitors the pressure within the lamp assembly (205). This pressure information is conveyed to the pressure monitoring circuitry (270). The pressure monitoring circuitry (270) may convert the pressure information to a corresponding temperature. This temperature is then compared to the first threshold. If the temperature is greater than the first temperature threshold, the first projector protection feature (250) opens the switch (255), thereby cutting power to the lamp assembly.

While the lamp is thus temporarily rendered inoperable when any of the thresholds has been surpassed, the lamp assembly (205) is allowed to cool such that the temperature of the lamp assembly is thereby reduced without permanent failure of the lamp assembly (205). Accordingly, once the temperature is again below the first temperature threshold and the fan (230) is operating properly, the lamp assembly (205) may again be operated. While the first projector protection feature (250) has been described includes three sensors and circuitry for processing information from three sensors, those of skill in the art will appreciate any number of sensors and corresponding circuitry may be used.

The lamp assembly (205) also includes a second projector protection feature. The second projector protection feature is engaged at a second threshold. For example, the second threshold may be engaged when the lamp assembly surpasses a second higher temperature threshold. When the second projector protection feature is engaged, the second projector protection feature decreases the temperature within the lamp assembly (205) in a controlled manner.

According to several exemplary embodiments discussed below, the second projector protection feature provides for a positive and permanent disabling of the lamp assembly (205). According to some of these embodiments, the second projector protection features allow the lamp assembly to fail in a controlled manner while reducing temperature of the gas sealed within the lamp assembly (205). The general operation of such an assembly will now be discussed.

Figure 3:
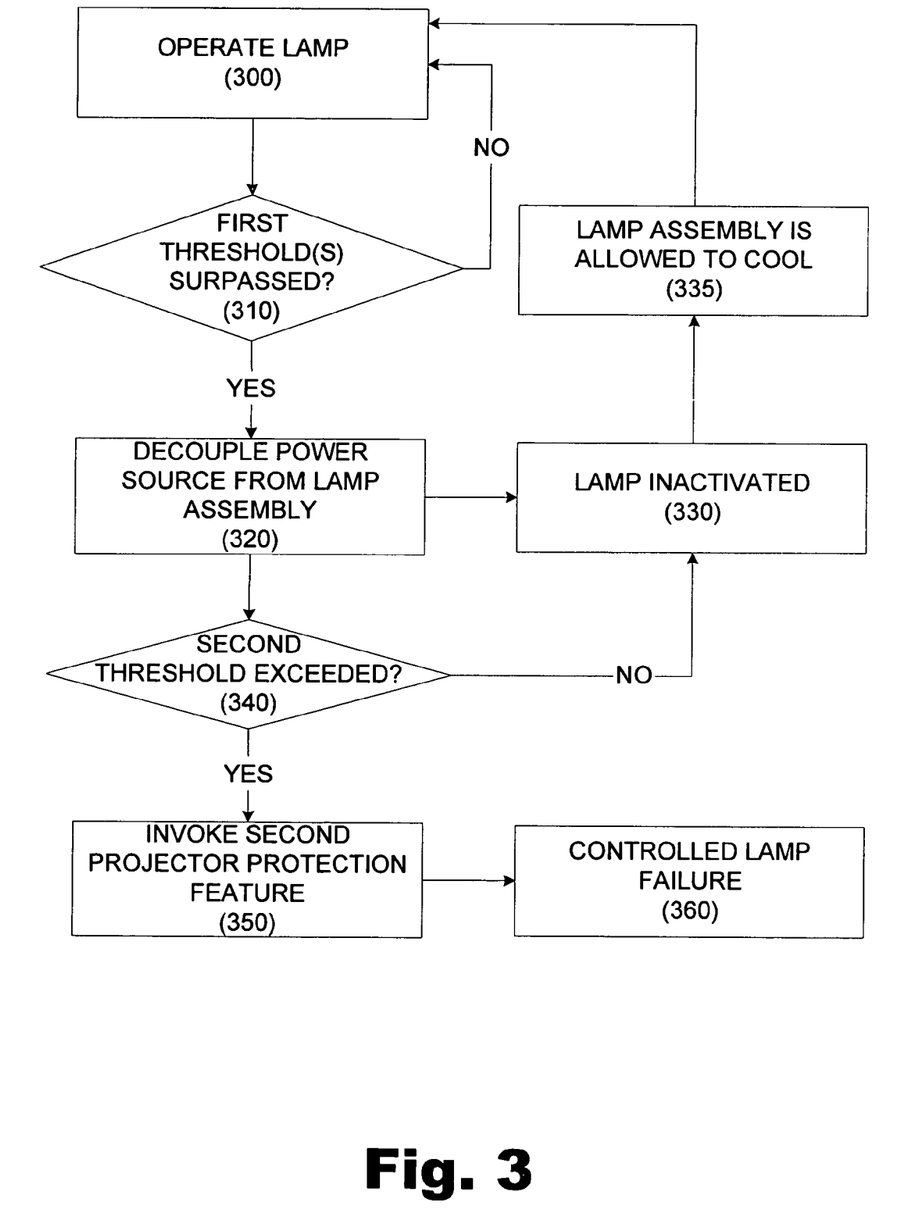
FIG. 3 is an operational schematic of a light source module according to one exemplary embodiment.

FIG. 3 illustrates a schematic view of the operation of a light source module that includes a first pressure projector protection feature and a second pressure projector protection feature. As seen in FIG. 3, during operation of the light source module, the lamp assembly operates normally (step 300). For example, a voltage difference between an anode and a cathode causes an arc in the presence of a pressurized gas to thereby generate light.

In a xenon lamp assembly, light is generated when voltage arcs from an anode to a cathode in the presence of pressurized xenon. The operation of the lamp assembly also produces heat, some of which accumulates in the lamp assembly.

As previously discussed, the light source modules frequently include a fan that directs air to the lamp assembly. As the air passes over the lamp assembly, the airflow removes heat from the lamp assembly thereby cooling it. The amount of heat that is allowed to accumulate in the lamp assembly, and thus its temperature, is dependent, at least in part, on how much heat is removed from the lamp assembly by forced convection cooling due to the operation of the lamp assembly.

While the lamp is thus operating normally, one or more first thresholds may be monitored. For example, the temperature of the lamp assembly may be measured either directly or indirectly, as described above. Further, the operating condition of a fan may also be monitored. While the first thresholds remain unsurpassed, such that temperature of the lamp assembly remains below the first temperature threshold and the fan continues to operate (NO, determination 310); the light source module will continue to operate as normal.

If any of the first thresholds are surpassed, (YES, determination 310), the power source and lamp assembly may be decoupled (step 320) and the lamp assembly may thus be rendered temporarily inoperable (step 330). For example, if the temperature of the lamp assembly exceeds any one the first temperature threshold and/or if it sensed that the fan is not drawing sufficient current, the power source may be decoupled from the lamp assembly.

Once power to the lamp assembly has been cut, the lamp assembly may then be allowed to cool (step 335). Once the temperature the lamp assembly has decreased sufficiently, the lamp assembly may again be operated (step 300). Any number of first thresholds may be utilized. In such a configuration, meeting or exceeding any single first threshold may be sufficient for the light source module to suspend operation of the lamp assembly.

As a result, the first projector protection feature allows the lamp assembly to be stopped in a non-permanent manner such that the lamp assembly may again be operated at a late time. Several exemplary first projector protection features include, without limitation, a power shutoff switch that is activated by any of the circuitry discussed above and a compliant face cap, as will be discussed in more detail below.

If the first threshold is exceeded (YES, determination 310), the light source module determines whether the second threshold has been exceeded (determination 340). If the conditions of the lamp assembly remain below the second threshold but above the first threshold (NO, determination 340), the lamp is inactivated (step 330) and allowed to cool (step 335).

In addition, the lamp assembly may include physical features that are automatically invoked (step 350) when the second threshold has been exceeded. These features may be configured to deform to reduce the temperature of the gas in a controlled manner. As the features deform, they may do so in a permanent manner such that the lamp assembly is rendered permanently inoperable (step 360). The controlled reduction of the temperature of the gas reduces the possibility that the lamp assembly will suddenly fail.

As previously introduced, the second temperature projector protection feature(s) may be invoked after the first pressure relief apparatus has been invoked. Accordingly, the second projector protection feature is a second or redundant feature to help ensure that the lamp assembly will not suddenly fail. Further, according to several exemplary embodiments, the second projector protection feature may be reliably actuated, regardless of whether the light source module is operating. Several exemplary light source modules and lamp assemblies will now be discussed in more detail.

Lamp Assembly including Face Cap with Relief Tabs

Figure 4:
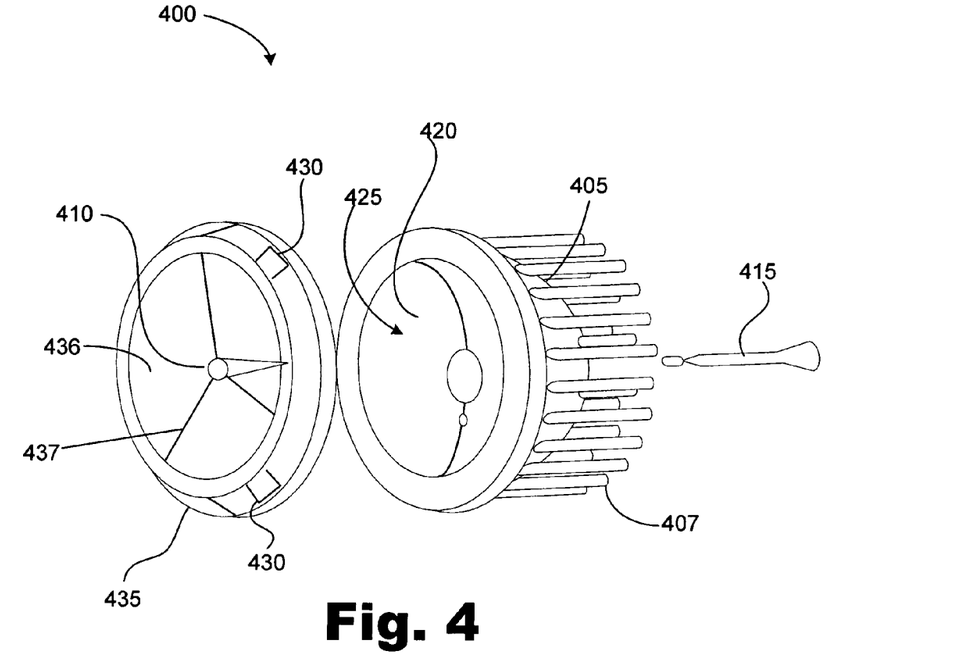
FIG. 4 is an exploded perspective view of a lamp assembly according to one exemplary embodiment.

FIG. 4 illustrates an exploded perspective view of a lamp assembly (400) according to one exemplary embodiment. The lamp assembly (400) includes a reflector (405), a cathode (410), and an anode (415). When the lamp assembly (400) is assembled, the anode (415) is sealingly coupled to the reflector (405). The cathode (410) is also sealingly coupled to the reflector (405).

The reflector (405) includes a reflective surface formed in a cavity (425) defined in the reflector (405). The cavity (425) may be hyperbolic or parabolic in profile. As a result, a substantial portion of light originating from a focal point of the cavity (425) reflects off the reflective surface (420) and out of the reflector (405). The reflector (405) shown includes a plurality of cooling fins (407).

The temperature of the gas within the lamp assembly (400) may be monitored as discussed above. Further, first projector protection feature similar to that discussed above may be used. The lamp assembly (400) includes a face cap (435). The face cap (435) supports a window (436) and cathode support structure (437), which in turn supports the cathode (410). The face cap (435) has stamped tabs (430) formed thereon, which act as second projector protection features. The edges of the stamped tabs (430) are thinner than the rest of the face cap (435). As a result, the second projector protection features (430) provide a predictable location for failure of the face cap as the temperature of the xenon within the lamp assembly surpasses a second threshold.

The force exerted on the tabs corresponds to the surface area of the tabs multiplied by the pressure within the lamp assembly (400). The force due to the pressurized xenon is countered by stress and shear forces of the material of the face cap in the edges of the tabs (430).

Figure 5:
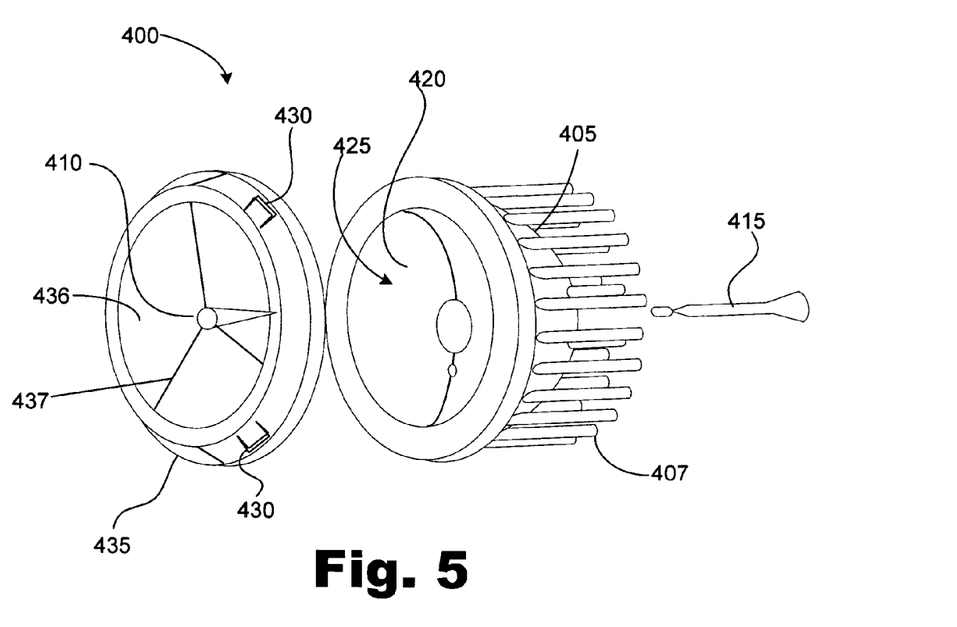
FIG. 5 is an exploded perspective view of a lamp assembly according to one exemplary embodiment.

The relatively shallower portions in the edges are able to withstand less force, such that these portions fail before the rest of the face cap in response to pressure within the lamp assembly. As seen in FIG. 5, these portions fail by deforming outwardly to create openings once the force exerted on the tab (430) exceeds the material stress and shear forces of the edges. As the edges fail, the xenon gas is released through the opening in the face cap formed by the failure of the tabs. Thus, once the second projector protection features are invoked, the lamp assembly (400) is rendered permanently inoperable. Further, as the xenon gas is released, it is released in a controlled manner.

Face Cap with Compliant/Yieldable Sections

Figure 6:
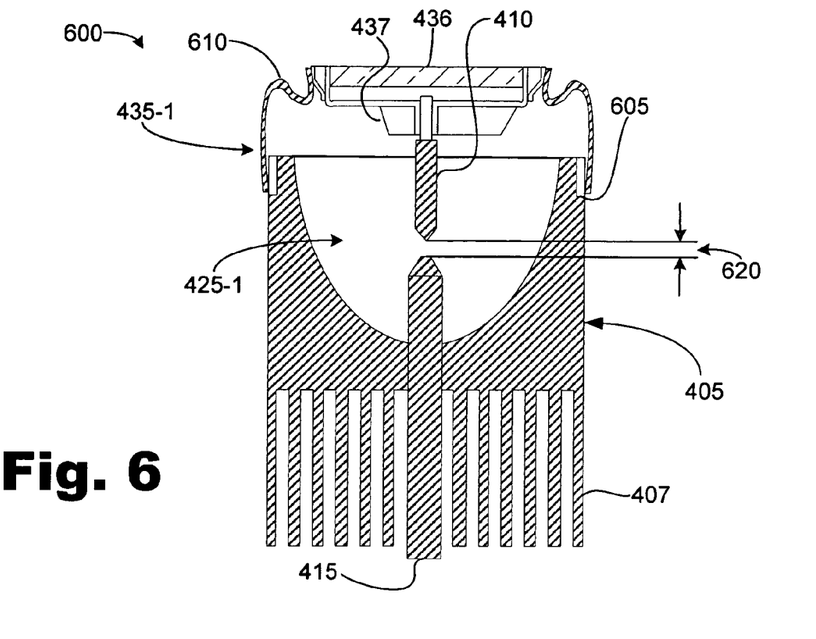
FIG. 6 is a cross sectional view of a lamp assembly according to one exemplary embodiment.
Figure 7:
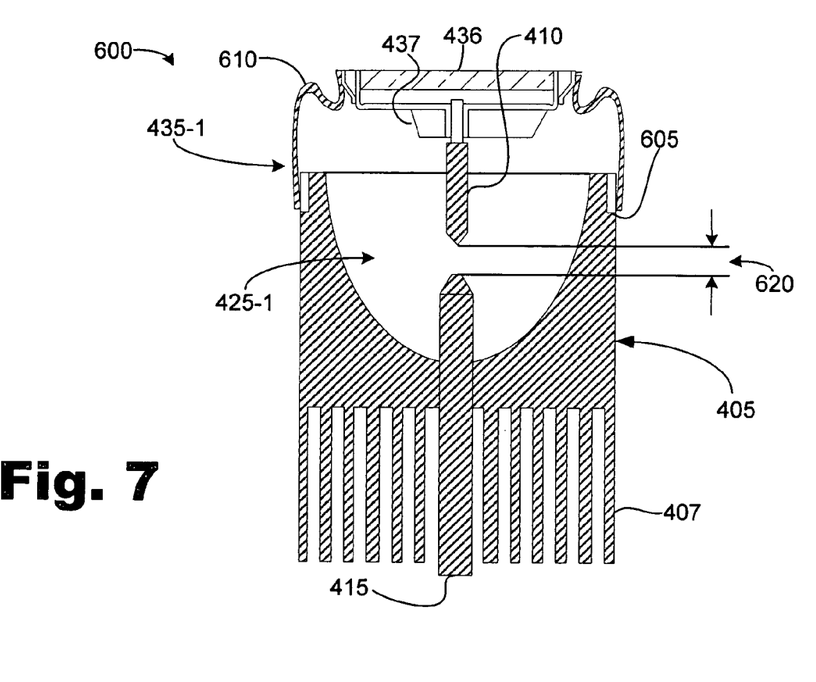
FIG. 7 is a cross sectional view of a lamp assembly according to one exemplary embodiment.
Figure 8:
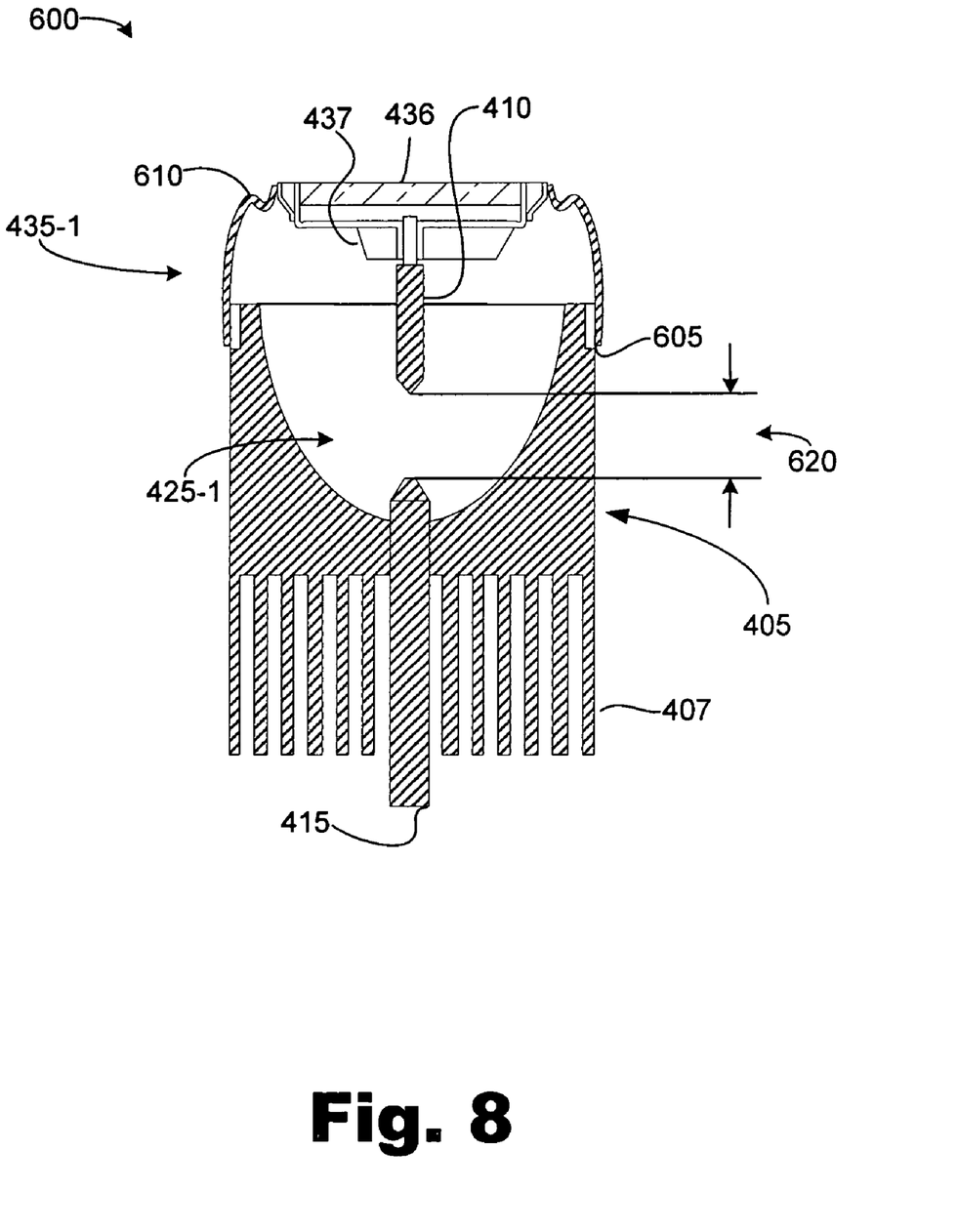
FIG. 8 is a cross sectional view of a lamp assembly according to one exemplary embodiment.

FIGS. 6-8 illustrate a lamp assembly (500) that includes a face cap (435-1). In particular, FIG. 6 shows the face cap (435-1) in a neutral or substantially un-deformed state. FIG. 7 shows the face cap (435-1) in an intermediate state wherein the face cap (435-1) is elastically deformed. FIG. 8 shows the face cap (435-1) in a final state wherein the face cap (435-1) is plastically deformed. Each of these figures will be discussed in more detail below.

FIG. 6 illustrates a cross-sectional view of the lamp assembly (600) in an undeformed or neutral state. The face cap (435-1) is electrically isolated from the reflector (405) by a ceramic ring (605). The face cap (435-1) includes a compliant section (610). While the pressure within the lamp assembly (600) remains below the first temperature threshold, the compliant section (610) remains substantially undeformed.

As seen in FIG. 7, as the temperature within the lamp assembly (600) approaches the first temperature threshold, the temperature is sufficient to cause the xenon gas to exert a sufficient force on the compliant section (610) to cause the curved compliant section (610) to begin to straighten. As the curved compliant section (610) is straightened, the size of the gap (620) between the cathode (410) and anode (415) is increased.

At some point, the gap (620) becomes sufficiently large that the applied voltage difference is unable to cause an arc between the anode (415) and the cathode (410). Consequently, such a separation of the anode (415) and cathode (410) prevents current from flowing through the lamp assembly (600), such that the lamp assembly (600) is thus rendered temporarily inoperable. While the lamp assembly (600) is thus inoperable, it may be allowed to cool. As the lamp assembly (600) cools, the face cap (435-1) will return to its neutral state. Thereafter, the lamp assembly (600) may be operated again. While the pressure within the reflector is above the first temperature threshold, but below the second threshold, the face cap will continue to deform elastically.

As seen in FIG. 8, if conditions exist to cause the continued deformation of the compliant section (610), the compliant section (610) will plastically deform. As the compliant section (610) plastically deforms, the volume of the cavity (425-1) will increase. The amount of xenon gas within the cavity (425-1) remains constant. By increasing the volume of the cavity (425-1), the pressure of the constant amount of xenon gas is thereby reduced. As the pressure of the xenon gas is thus reduced in the cavity (425-1), the xenon gas is allowed to cool.

Accordingly, the present exemplary embodiment includes a compliant section that elastically deforms as a first temperature relief apparatus and plastically deform as a second pressure projector protection feature. The elastic deformation allows the lamp assembly (500) to be temporarily rendered inoperable such that operation may resume once conditions have permitted the temperature in the lamp assembly to drop below the first temperature threshold. The plastic deformation allows operation of the lamp assembly (500) to be permanently disabled to provide pressure relief for the lamp assembly (500), thereby reducing the possibility that the lamp assembly (500) will suddenly fail.

In conclusion the present apparatuses, assemblies, and methods provide for enhanced cooling of a lamp assembly, thereby increasing the useful life of the lamp assembly. In addition, the integral reflector is formed of relatively inexpensive materials and may be so formed rapidly with inexpensive techniques, each of which may allow for the formation of an inexpensive lamp assembly. Such lamp assemblies may include xenon gas short arc systems, such as those used in projection systems. As a result, the use of such inexpensive lamp assemblies and the increased useful life of the lamp assemblies may decrease the cost of owning and operating projection systems.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A light source module, comprising:
   a lamp assembly having a reflector, said lamp assembly having a pressurized gas contained therein, an anode coupled to said reflector, and a cathode coupled to said reflector; and
   a projector protection system including at least one first protection feature for suspending current flow from said cathode to said anode when at least one first threshold is exceeded and at least one second protection feature for reducing a pressure of said pressurized gas when at least one second threshold is exceeded.

2. The light source module of claim 1, wherein said first rejecter protection feature includes a power shutoff switch.

3. The light source module of claim 1, and further comprising a face cap sealingly coupled to said reflector and said cathode and wherein said second protection feature includes at least one compliant section formed on said face cap.

4. The light source module of claim 1, wherein said first threshold includes a temperature of said lamp assembly.

5. The light source module of claim 1, wherein said second; protection feature includes ax least one pressure relief tab configured to open when said pressure exceeds said second threshold thereby reducing said pressure of said pressurized gas.

6. The light source module of claim 1, and further comprising a face cap coupled to said reflector and said cathode and wherein said first protection feature includes elastic deformation of at least one compliant section formed on said face cap and said second protection feature includes a plastic deformation of said at least one compliant section.

7. The light source module of claim 1, wherein said second protection feature is configured to provide a controlled release of said pressurized gas when said second threshold has been exceede&

8. The light source module of claim 1, wherein said second projection feature is configured to provide an increased volume for said pressurized gas when said second threshold has been exceeded thereby reducing said uressure of said pressurized gas.

9. A display system, comprising:
a light source module that includes a lamp assembly including an integrated reflector and heat sink, said lamp assembly having a pressurized gas contained therein, an anode coupled to said integrated reflector and heat sink, and a cathode coupled to said integrated reflector and heat sink, and a pressure relief system including at least one first pressure projector protection feature for suspending current flow from said cathode to said anode when at least one first threshold is exceeded and at least one second pressure projector protection feature for stopping said current flow when at least one second Threshold is exceeded, said second threshold being higher than said first threshold;
an illumination optics assembly optically coupled to said light source module; and
a spatial light modulator optically coupled to said illumination optics assembly.

10. The system of claim 9, and further comprising an image processing unit configured to control said light source module and said spatial light modulator.

11. The system of claim 10, and fin-ther comprising display optics optically coupled to said spatial light modulator.

12. A display system comprising:
a light source niodide having a integrated reflector and heat sink; and
a first projector protection feature configured to suspend operation of said light source module when a first threshold is exceeded;
a second projector projection feature configured to stop operation of the light source module when a second tbresholcl is exceeded; and
a spatial light modulator in optical communication with said light source module.

13. The system of claim 12, wherein the first projector projection feature reduces or terminates power delivered to the light source module when the first threshold is exceeded.

14. The system of claim 12, wherein the second projector projection feature permanently disables the light source module.

15. The system of claim 12, wherein the light source module includes a reflector portion, a lens, and a face cap that sealingly couples the lens to the reflector portion.

16. The.system of claim 15, wherein the first or second projector projection feature is a portion of the face cap that deforms when a sufficient pressure accumulates within the light source module.

17. The system of claim 15, wherein the second projector projection feature is a portion of the face cap that releases a gas from the tight source module when a sufficient gas pressure accumulates within the light source module.

18. The system of claim 15, wherein the first threshold being exceeded is indicated by detection of a cooling fan failure.

19. The system of claim 15, wherein the first threshold and/or the second threshold is a detected pressure or temperature threshold level.

20. A method of forming a light source module, comprising:
selecting first and second thresholds;
forming a lamp assembly having a reflector, a cathode assembly, and an anode, said lamp assembly being configured to generate light in response to a flow of current between said anode and said cathode;
providing a pressurized gas in said lamp assembly;
suspending said flow of current when said first threshold is exceede; and
relieving a pressure of said pressurized gas when said second threshold is exceeded.

21. The method of claim 20, wherein forming said lamp assembly includes forming a face cap as part of said cathode assembly, said face cap having at least one compliant section.

22. The method of claim 20, wherein forming said lamp assembly includes forming a face cap as part of said cathode assembly, said face cap having at least one pressure relief tab.

23. A light source module, comprising:
means for generating light;
means for suspending said means for generating light when a first threshold is exceeded; and
means for permanently disabling said means for generating light when a second threshold is exceeded.

24. The light source module of claim 23, and further comprising means for detecting whether said flrst threshold has been exceeded.

25. The light source module of claim 23, and further comprising means for providing a controlled failure of said lamp assembly when said second threshold is exceeded.

26. A lamp assembly, comprising:
a reflector having a pressurized gas contained therein,
an anode coupled to said reflector,
a face cap sealing coupJed to said reflector; said face cap having a cathode coupled thereto such that a gap is formed between said anode and said cathode; and
at least one compliant section on said face cap, said compliant section being configured to be elastically deformed when said gas is above a first threshold to increase a size of said gap to suspend a flow of current between said anode and cathode and to be yieldably deformed when said gas is above a second threshold to increase said size of said gap to stop current flow between said anode and cathode.

27. The assembly of claim 26, wherein said reflector comprises a metallic material.

28. The assembly of claim 27, and further comprising a ceramic seal disposed between said face cap and said reflector.

29. The assembly of claim 27, wherein said reflector comprises an integrated reflector and heat sink.

* * * * *

UNITED STATES PATENT AND TRADEMARK OFFICE
CERTIFICATE OF CORRECTION

PATENT NO. : 7,458,690 B2
APPLICATION NO. : 11/093431
DATED : December 2, 2008
INVENTOR(S) : Winthrop D. Childers et al.

It is certified that error appears in the above-identified patent and that said Letters Patent is hereby corrected as shown below:

In column 3, line 6, delete "projection" and insert -- protection --, therefor.

In column 3, line 48, delete "placing the" before "passing".

In column 4, line 6, after "threshold" insert -- may be used --.

In column 5, line 59, after "exceeds" delete "any one".

In column 6, line 6, delete "late" and insert -- later --, therefor.

In column 8, line 41, in Claim 2, delete "rejecter" before "protection".

In column 8, line 48, in Claim 5, after "second" delete ";".

In column 8, line 49, in Claim 5, delete "ax" and insert -- at --, therefor.

In column 8, line 62, in Claim 7, delete "exceede&" and insert -- exceeded. --, therefor.

In column 8, line 66, in Claim 8, delete "uressure" and insert -- pressure --, therefor.

In column 9, line 13, in Claim 9, delete "Threshold" and insert -- threshold --, therefor.

In column 9, line 22, in Claim 11, delete "fin-ther" and insert -- further --, therefor.

In column 9, line 26, in Claim 12, delete "niodide" and insert -- module --, therefor.

In column 9, line 31, in Claim 12, delete "projection" and insert -- protection --, therefor.

In column 9, line 33, in Claim 12, delete "tbresholcl" and insert -- threshold --, therefor.

In column 9, line 37, in Claim 13, delete "projection" and insert -- protection --, therefor.

In column 9, line 40, in Claim 14, delete "projection" and insert -- protection --, therefor.

In column 9, line 45, in Claim 16, delete ".systern" and insert -- system --, therefor.

In column 9, line 46, in Claim 16, delete "projection" and insert -- protection --, therefor.

In column 9, line 50, in Claim 17, delete "projection" and insert -- protection --, therefor.

In column 9, line 51, in Claim 17, delete "tight" and insert -- light --, therefor.

In column 10, line 13, in Claim 20, delete "exceede" and insert -- exceeded --, therefor.

In column 10, line 29, in Claim 24, delete "first" and insert -- first --, therefor.

CERTIFICATE OF CORRECTION (continued)
U.S. Pat. No. 7,458,690 B2

In column 10, line 37, in Claim 26, delete "coupJed" and insert -- coupled --, therefor.

Signed and Sealed this

Sixteenth Day of March, 2010

David J. Kappos
*Director of the United States Patent and Trademark Office*